United States Patent [19]
Perkins

[11] 3,828,714
[45] Aug. 13, 1974

[54] MARINE HARDWARE
[75] Inventor: Marvin S. Perkins, North Miami Beach, Fla.
[73] Assignee: Perkins Marine Lamp and Hardware Corporation, Miami, Fla.
[22] Filed: June 16, 1971
[21] Appl. No.: 153,603

[52] U.S. Cl. ............................................... 114/218
[51] Int. Cl. ............................................ B63b 21/08
[58] Field of Search............. 114/218; 24/115 J, 127

[56] References Cited
UNITED STATES PATENTS
3,118,418  1/1964  Faul.................................... 114/218
3,352,273  11/1967 Herreshoff et al.................. 114/218
3,125,978  3/1964  Faul.................................... 114/218
FOREIGN PATENTS OR APPLICATIONS
873,245  7/1961  Great Britain...................... 114/218

Primary Examiner—Milton Buchler
Assistant Examiner—Gregory W. O'Connor
Attorney, Agent, or Firm—William R. Liberman

[57] ABSTRACT

A marine accessory device such as a cleat, bow light, ventilator, tank filler pipe or the like, consists of a pair of interconnected members one of which is formed of a relatively flexible polymeric resin such as a polycarbonate resin and the other is formed of a rigid metal. The device is mounted on a marine vessel by securing the polymeric resin member to a vessel surface.

1 Claim, 17 Drawing Figures

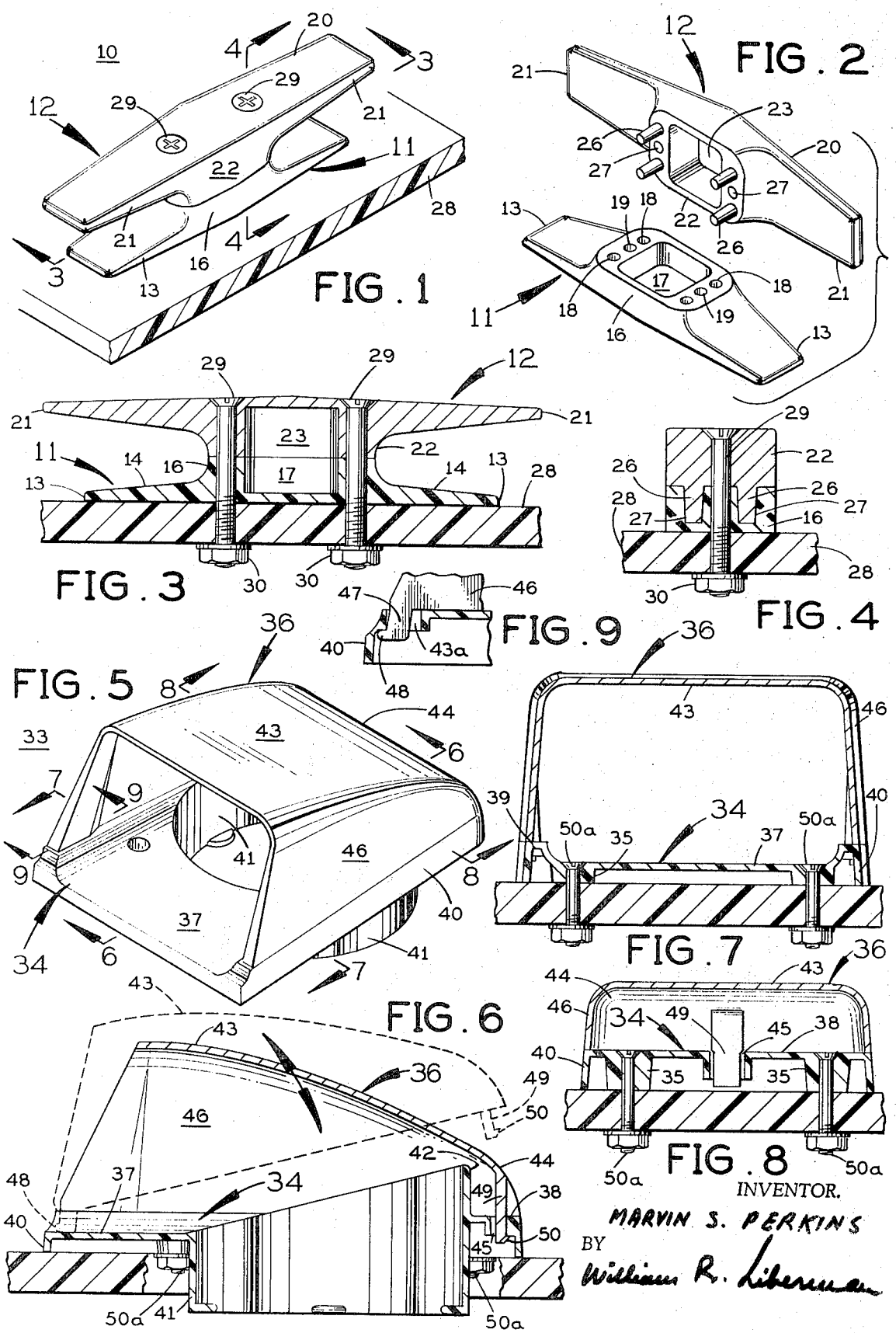

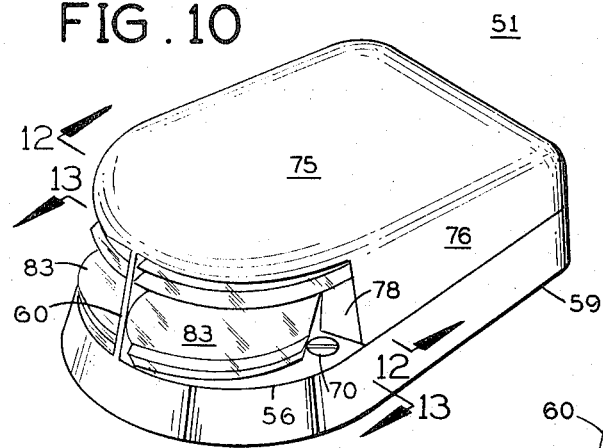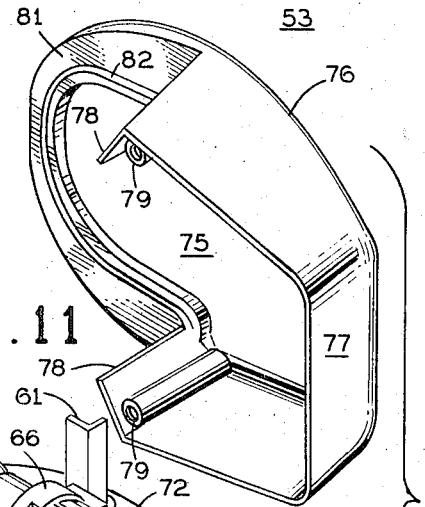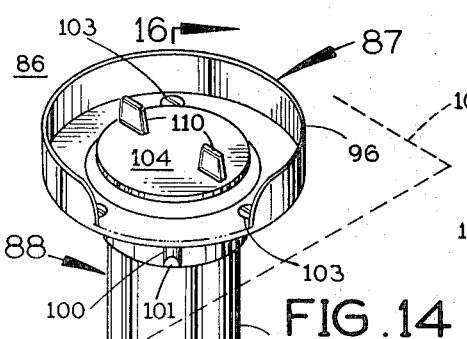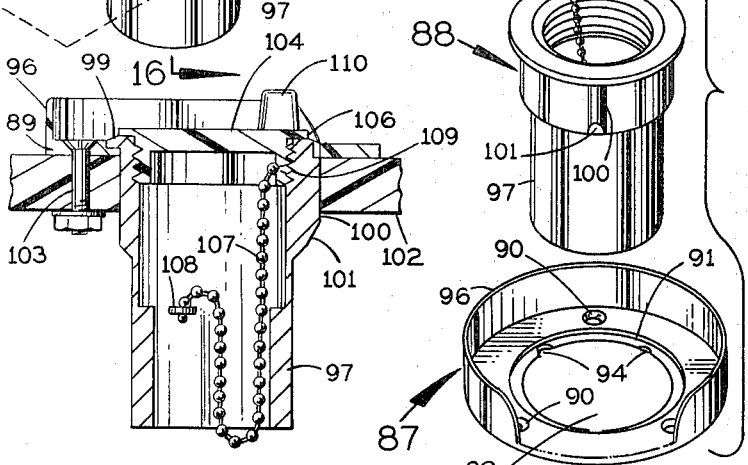

MARINE HARDWARE

BACKGROUND OF THE INVENTION

The present invention relates generally to improvements in marine hardware and the like, and it relates particularly to improved marine accessory devices and fittings for mounting on a vessel, including such articles as bow lights, cleats, ventilators, tank fillers and the like.

Marine hardware, lamps and other marine accessories are usually formed of metal because of many of the highly desirable properties and characteristics of many metals in a marine environment. When these accessories are mounted on or secured to a wood surface of the vessel no problems are usually encountered as a consequence of such mounting. However, a majority of the smaller and pleasure type of sailing and power vessels now available and in wide use are formed of glass fiber-reinforced plastics, such as polyesters and the like, and many are formed of relatively active metals such as aluminum. The mounting of metal marine accessories to such plastic and metal surfaces is accompanied by numerous drawbacks and disadvantages. Thus, where the mounting surface is formed of a glass fiber-reinforced plastic, the mounting thereonto of the conventional metal marine accessory causes crazing of the plastic in the area of the mounted accessory and frequently results in deep cracks in such surface. On the other hand, where the mounting surface is an active metal such as aluminum, there is an intense electrolytic action at the interface of the metals resulting in high corrosion.

SUMMARY OF THE INVENTION

A principal object of the present invention is to provide improved marine devices such as marine hardware, lamps and the like.

Another object of the present invention is to provide an improved marine accessory structure.

Still another object of the present invention is to provide an improved marine accessory structure which is adapted for mounting onto various surfaces without damage to the support surfaces and with minimization of corrosion due to electrolytic action.

A further object of the present invention is to provide a marine accessory structure of the above nature characterized by its high versatility and adaptability, ruggedness, and attractive appearance.

The above and other objects of the present invention will become apparent from a reading of the following description taken in conjunction with the accompanying drawings which illustrate preferred embodiments thereof.

In a sense, the present invention contemplates the provision of a marine accessory article comprising an assembly of interconnected sections defining said article and including a first member formed of a relatively flexible organic polymeric resin and a second member formed of a relatively rigid metal and means for securing said first member to a support.

As applied to a cleat, the first or polymeric resin member includes a longitudinal base section having a medial upwardly directed post section and the second or metal member includes a longitudinal arm having a depending medial post section superimposed on the bottom post section and positioned thereon by interfitting sockets and pins. The cleat is secured to a support surface by bolts projecting through the cleat by way of the post sections. In the form of a ventilator the improved structure includes an organic polymeric resin base secured to the mounting surface and having a depending conduit registering with an opening therein and a plurality of coupling apertures. An air passage metal shell, open at its front and bottom, is located on the base and secured thereto by coupling elements depending therefrom and engaging the coupling apertures. According to another form of the present invention, as embodied in a bow light, the first member has integrally formed at the front thereof a medial vertical longitudinal panel and rearwardly thereof a bulb socket bracket. The second member includes a top wall and depending rear wall and side walls which extend from the rear wall to a point short of the front thereof and is bolted to the first member. Curved Fresnel lenses extend between the front panel and the side wall front edges and have top and bottom ridges engaging corresponding grooves in the top wall and base. As applied to a tank filler, the first member includes an annulus having peripherally spaced apertures for attaching the annulus to a support surface and the second member includes a pipe depending from the annulus opening and having a top flange engaging the top face of the opening border and radial projections engaging the underface of the opening border.

The improved marine accessory structures of the present invention are rugged, simple and of highly attractive appearance and may be securely and firmly mounted to any support surface without any danger of damage to the support surface or the accessory and with the obviation of electrolytic action and consequent corrosion.

BRIEF DESCRIPTION OF THE DRAWINGS

FIG. 1 is a perspective view of a cleat embodying the present invention;

FIG. 2 is an exploded perspective view thereof;

FIG. 3 is a sectional view taken along line 3—3 in FIG. 1;

FIG. 4 is a sectional view taken along line 4—4 in FIG. 1;

FIG. 5 is a front perspective view of another embodiment of the present invention in the form of a ventilator;

FIG. 6 is a sectional view taken along line 6—6 in FIG. 5, the ventilator being shown by broken line in partially assembled condition;

FIG. 7 is a sectional view taken along line 7—7 in FIG. 5;

FIG. 8 is a sectional view taken along line 8—8 in FIG. 5;

FIG. 9 is a sectional view taken along line 9—9 in FIG. 5;

FIG. 10 is a perspective view of a bow light embodying the present invention;

FIG. 11 is a partially exploded perspective view thereof;

FIG. 12 is a sectional view taken along line 12—12 in FIG. 10;

FIG. 13 is a sectional view taken along line 13—13 in FIG. 10;

FIG. 14 is a perspective view of a fuel tank filler embodying the present invention;

FIG. 15 is an exploded perspective view thereof;

FIG. 16 is a sectional view taken along line 16—16 in FIG. 14; and

FIG. 17 is a bottom plan view thereof.

DESCRIPTION OF THE PREFERRED EMBODIMENTS

Referring now to the drawings and particularly FIGS. 1 to 4 thereof which illustrate a preferred embodiment of the present invention, reference numeral 10 generally indicates the improved device which is in the form of a cleat including a lower, first or base member 11 and an upper second member 12. The first member 11 is formed of a flexible organic polymeric resin of high strength and weather and corrosion resistance and of low water absorption and high resistance to gasoline, oil, and other fuels and similar solvents. Advantageously, first member 11 is formed of a polycarbonate resin such as LEXAN (a current product of General Electric) or the like engineering thermoplastic by injection molding or other suitable process and may be reinforced by fiber glass or other fibers and may be colored as desired.

First or upper member 11 includes a longitudinally extending base section 13 having a flat planar underface and opposite top faces 14 which converge upwardly and join an integrally formed vertical lower post section 16. A centrally located well 17 is formed in the top face of post section 16, the upper face of post section 16 being horizontal and flat, and the sides thereof each have a pair of vertical cylindrical coupling sockets 18 formed therein and a vertical bore 19 between each pair of sockets 18. The sides of post sections 16 are arcuate and merge smoothly into the base top faces 14.

The second or upper member 12 is formed of rigid metal such as bronze, stainless or plated steel or the like, and includes a longitudinally extending top piece 20 of greater length than base section 13 and including opposite outwardly tapered arms 21. Medially integrally formed with top piece 20 is a depending post section 22 which is symmetrically shaped with respect to lower post section 16 and has a central well 23 congruent to well 17. The underface 24 of post section 22 matingly engages the top face of lower post section 16 and coupling pins 26 are integrally formed with upper post section 22 and depend therefrom into mating engagement with sockets 18. Vertical bores 27 are formed in upper member 12 in axial alignment with bores 19.

The cleat 10 is locked in its assembled condition and secured to a deck 28 formed of fiber glass reinforced polymeric resin or other material by a pair of bolts 29 engaging respective aligned bores 19 and 27 and corresponding openings in the deck 28, the bolts 29 being provided with cooperating washers and nuts 30 engaging the underface of deck 28. Cleat 10 may be mounted on other surfaces with other suitable fastening means. By reason of the flexibility and nature of the material forming the lower member 11 the chances of damaging deck 28 are minimized.

In FIGS. 5 to 9 of the drawings there is illustrated a ventilator 33 embodying the present invention and including a lower first or base member 34 formed of a flexible polymeric resin as aforesaid and a second or upper metal member 36 coupled to the first or lower member 34. Base 34 is integrally formed as a unit and includes a horizontal forward top wall 37 and a horizontal rear top wall 38 at a higher level than top wall 37. The side borders 39 of front top wall 37 are coplanar with rear top wall 38 and a continuous peripheral skirt 40 depends from the front, rear and side edges of walls 37 and 38 and has a horizontal coplanar bottom edge.

An air circulating vertical chimney or duct 41 depends from and is integrally formed as part of base member 34 and projects through a corresponding opening in the base top wall. The top edge of duct 41 is forwardly downwardly inclined to provide a rear deflector wall 42 projecting above the level of rear horizontal wall 38. Formed in the front elevated side borders of wall 37 is a pair of longitudinal coupling slots 43a and medially formed in the rear of wall 38 is a transverse coupling slot 45. A plurality of vertically bored bosses 35 depend from the underfaces of walls 37 and 38 and have underfaces not below the level of skirt wall 40.

The second or upper member 36 is formed of relatively rigid metal, as previously described, and is in the shape of a shell open at its front and bottom and including a rearwardly downwardly inclined top wall 43 terminating in a downwardly curved rear section 44. Side walls 46 depend from the side edges of top wall 43 and join rear section 44, the bottom edges of side walls 46 and rear section 44 lying in a common horizontal plane.

Depending from the front bottom corners of side walls 46 are a pair of parallel vertical coupling lugs 47 which project through corresponding coupling slots 43a and terminate in forwardly directed bottom toe projections 48 which engage the front bottom borders of slots 43a. A coupling tongue 49 medially depends from wall rear section 44 slightly forwardly thereof and engages the rear coupling slot 45, tongue 49 terminating in a rearwardly projecting abutment 50 having a cammed bottom face, and a horizontal top face which engages the underface of a tubular section depending from the border of slot 45. In assembling the first and second members 34 and 36 coupling lugs 47 are inserted into full engagement with slot 43a and with member 36 being rearwardly upwardly inclined, as shown by broken line in FIG. 6, and member 36 is then swung downwardly to snap tongue 49 into coupling engagement with slot 45. Base member 34, before attachment of shell 36, is fastened to the deck or other support surface by bolts 50a,50a engaging aligned openings in base member 34 and posts 35 and the deck to which the ventilator is mounted.

Referring now to FIGS. 10 to 13 which illustrate a bow light 51 embodying the present invention, reference numeral 52 designates the first, or lower base member which is formed of a flexible polymeric resin, and reference numeral 53 designates the housing shell which is formed of a relatively rigid metal. Base member 52 includes a horizontal base wall 54 having an arcuate front edge 56 joined by converging side edges 57 to a transverse rear edge 58, and a downwardly outwardly inclined skirt wall 59 depends from the peripheral edges of base wall 54. Integrally medially formed with the front border of base wall 54 is a vertical partition panel 60 extending longitudinally rearwardly for a short distance and a pair of angular uprights 61 are symmetrically positioned on top wall 54 inwardly of the junction of side edges 57 and front edge 56. A curved lens locking groove 63 in top wall 54 extends from each side of panel 60 to a corresponding upright 61.

A lamp socket bracket 64 is positioned atop base wall 54 rearwardly of uprights 61 and is integrally formed with wall 54. Bracket 64 includes a pair of upwardly projecting confronting arcuate resilient channel shaped arms 65 delineating a top restricted throat and engages and supports a conventionally constructed lamp socket 66 which releasably holds a forwardly projecting lamp 67. Countersunk bores 68 are formed in the front corners of base wall 54 and in integrally formed depending posts 69, bolts 70 engaging bores 68 and a mounting deck 71 for securing base member 52 thereto. Shortly rearwardly of bores 68 are a pair of coupling bores 72 which extend through base wall 54 and posts 73 depending therefrom. A ridge 74 extends between the outer edges of bores 72 along the side and rear borders of base wall 54.

The upper shell member 53 includes a rearwardly downwardly inclined top wall 75 similar in outline to but slightly smaller than that of base wall 54. Depending from the side and rear edges of top wall 75 are downwardly outwardly inclined side and rear walls 76 and 77 respectively, the bottom edges of walls 76 and 77 engaging the outer face of ridge 74 and the corresponding outer borders of base wall 54. Walls 78 projecting inwardly from the front edges of side walls 76 into engagement with uprights 61 and vertical posts are integrally formed in the corners between walls 76 and 78 and have vertical tapped bores therein which are engaged by screws 80 extending through posts 73 to secure members 52 and 53 in their assembled condition.

The front section of top wall 75 is cantilevered forwardly of walls 78 and the border of its underface is thickened, as at 81, and provided with a groove 82 which confronts and is parallel and of a shape congruent to that of groove 63. A pair of red and green curved Fresnel lenses 83 are entrapped between the confronting faces of walls 54 and 75 and extend between partition 60 and corresponding faces of uprights 61, the lenses 83 being provided with vertical ridges 84 along their top and bottom edges which are engaged by respective grooves 82 and 63.

A fuel tank filler 86 embodying the present invention is illustrated in FIGS. 14 to 17 and comprises a base member 87 formed of a flexible polymeric resin and a filler tube 88 formed of metal. Base member 87 includes an annular base or flange section 89 provided with peripherally spaced bolt receiving apertures 90. A depressed annular shoulder 91 is formed in base member 87 and surrounds the annular member central opening 92 and is provided along its inner edge with a number of peripherally spaced arcuate notches 94. An integrally formed upwardly directed shield 96 extends partly around the outer edge of base member 87.

The filler tube 88 is an integrally formed unitary piece and includes a vertical tube section 97 projecting through opening 92 and terminating at its top in an outerwardly directed peripheral flange 99 having an under face engaging the top face of shoulder 91 and an outwardly downwardly inclined top face. Peripherally spaced vertical ribs 100 are formed on the top outer face of tube section 97 and have downwardly inwardly inclined bottom faces 101 and flat top horizontal faces spaced below flange 99. In assembling base member 87 and tube 88 the lower end of tube 88 is pushed downwardly through opening 92 to bring rib bottom faces 101 into registry with notches 94 and the tube is further advanced so as to slide ribs 100 along the notches 94, which have been spread by rib bottom faces 101, until flange 99 is brought into engagement with shoulder 91, at which point notches 94 are between flange 99 and the rib top faces. The borders of notches 94 thus expand into position between flange 99 and the rib top faces to interlock members 87 and 88. The assembled filler tube may be secured to a deck 102 with the tube section 97 projecting below the deck by bolts 103 engaging base openings 90.

The upper part of tube 97 is internally threaded and a threaded plug 104 releasably engages the threaded section of tube 97. Plug 104 has a top peripheral flange 106 which separably engages the top face of flange 99 and is connected to pipe 97 by a suitable chain 107 which has one end connected to an eye member 108 formed on the inner face of tube 97 and its opposite end connected to the threaded skirt wall 109 of plug 104. To facilitate the tightening and loosening of plug 104 it is provided with a pair of diametrically opposite upwardly directed fingers 110.

While there have been described and illustrated preferred embodiments of the present invention, it is apparent that numerous alterations, omissions and additions may be made without departing from the spirit thereof.

I claim:

1. For use with a marine device having a plastic or metal surface a cleat including a first member formed of a relatively flexible organic polymeric resin and adapted to be fixedly superimposed on the said surface of the marine device and comprising a longitudinally extending base section and a first post section integrally formed with and projecting upwardly from said base section to extend outwardly from said surface, and a seocnd member formed of a relatively rigid metal and comprising a longitudinally extending arm cooperatively overlying said base section and a second post section integrally formed with and depending from said arm and disposed in aligned end to end engagement with said first post section, and fastening means passing through said posts for securing said members together and for anchoring said first member onto the surface.

* * * * *